United States Patent [19]
Soshi et al.

[11] Patent Number: 5,604,555
[45] Date of Patent: Feb. 18, 1997

[54] CAMERA

[75] Inventors: Isao Soshi, Tokyo; Hiroshi Terunuma, Chiba; Hiroshi Wakabayashi, Kanagawa, all of Japan

[73] Assignee: Nikon Corporation, Tokyo, Japan

[21] Appl. No.: 389,809

[22] Filed: Feb. 16, 1995

[30] Foreign Application Priority Data

Apr. 12, 1994 [JP] Japan .................................. 6-073537
Jun. 20, 1994 [JP] Japan .................................. 6-136789
Jun. 25, 1994 [JP] Japan .................................. 6-132900

[51] Int. Cl.$^6$ .................................................. G03B 17/00
[52] U.S. Cl. ................................................................ 396/440
[58] Field of Search ...................................... 354/203, 288

[56] References Cited

U.S. PATENT DOCUMENTS

| 4,152,062 | 5/1979 | Kobori .................................. 354/203 |
| 4,685,790 | 8/1987 | Uematsu .................................. 354/203 |
| 4,972,213 | 11/1990 | Stonoeham et al. .................... 354/203 |

FOREIGN PATENT DOCUMENTS 62-156641  7/1987  Japan .
3-287150  12/1991  Japan .

Primary Examiner—David M. Gray
Attorney, Agent, or Firm—Oliff & Berridge

[57] ABSTRACT

A camera includes a camera body and a regulation component mounted directly to the camera body with flatness of the film desired for photography being maintained by rail surfaces and a regulation surface. The dimensions of the camera body, the regulation component and the dimension allowances of the camera body and the film regulation component have a relationship that forms a space smaller than the thickness of the photographic film when the regulation component mounting surface and the camera body mounting surface of the regulation component are in contact, allowing the regulation component to be mounted directly to the camera body while the regulation surface of the regulation-component and the outer rail surface of the camera body maintain flatness. Alternatively, deformation units may be used to deform plastically or elastically with the tightening of an anchoring unit, which directly anchors the regulation component to the camera body to maintain flatness of the outer surfaces of the camera body and the regulation surfaces of the regulation component. The camera body and the regulation component may be made of the same material or materials with the same or nearly the same coefficients of thermal expansion so that when temperature changes occur involving the camera, the amount of thermal deformation of both the camera body and the regulation component is the same to assist in maintaining the flatness of the film regulation surfaces.

20 Claims, 12 Drawing Sheets

CAMERA

BACKGROUND OF THE INVENTION

1. Field of the Invention

The present invention relates to a camera, in particular to the photographic film holding structure of a camera.

2. Description of Related Art

A device has been disclosed, such as that shown in FIG. 12, which comprises a cross-sectional view showing the photographic film holding structure of a related art embodiment.

As shown in FIG. 12, a pressure plate unit 12 is attached to the back cover 14 of a camera by means of a spring unit 13 provided with springs such as a plate spring. In order for the photographic film 3 to be moved smoothly, the dimensions of the space between the pressure plate surface 12a of the pressure plate unit 12 and the surface of the inner rail 11f facing the pressure plate unit 12, i.e. the inner rail surface 11b, are defined by a space U, which is established so as to be slightly wider than the thickness of the film 3.

The pressure plate unit 12 presses, by the force of the spring unit 13, the film 3 from the back cover 14 toward the inside rail surface 11b. By this means, the film 3 is kept flat in a position facing the aperture A in the camera body 11 that is used for film exposure.

However, in the related art structure shown in FIG. 12, it is necessary that the spring unit 13 press the pressure plate unit 12 from the cover 14 side toward the outer rail surface 11a of the outer rail 11e facing the pressure plate unit 12. A space L2 from the photographic film 3 to the back cover 14 is necessary to accommodate the spring unit 13, thereby requiring the camera to be made larger.

In that structure, thermal deformation in the direction perpendicular to the optical axis of the lens 17 of the camera body 11 and to the direction of feeding of the film 3 is a problem. Even if the outer rails 11e of the camera body 11 deform in the perpendicular direction, the pressure plate unit 12 only makes direct contact with outer rail surfaces 11a due to spring force of the spring unit 13, as was the case before the deformation. Thus, the deformation of the outer rails 11e has no effect upon the pressure plate unit 12. Therefore, even after the deformation of the outer rails 11e, the pressure plate unit 12 does not distort and the film 3 maintains the flatness required for taking a picture.

In order to solve the problem of the large camera size required for spring unit 13 and other problems, applicants have developed the idea of directly anchoring a film regulation component 22 to the camera body 21 as shown in FIG. 5, thereby reducing the space from the photographic film 3 to the back cover 24. In FIG. 5, the regulation component 22 is directly attached to the camera body 21 by mounting screws 26, a space U being provided to enable the smooth movement of the film 3. The position of the film 3 in the direction of the optical axis of the lens 17 is regulated between the film regulation surface 22a of the regulation component 22 and the inside rail surface 21b, thereby keeping the film 3 flat in a position facing the aperture A. When a structure to anchor the film regulation component 22 directly onto the camera body 21 is adopted in this manner, a conventional back cover (one capable of opening and closing from the back of the camera body) becomes unnecessary. The actual mounting of the film is accomplished in such a manner as disclosed in Japanese Laid-Open Patent Application No. 62-156641. The camera disclosed in that publication is structured in such a way that the film rotates around the axis of the cartridge spool of the film, and the front edge of the film is inserted into the film scrolling opening toward the film exposure section from the cartridge chamber. A back cover capable of opening and closing is not present in that camera. Instead, a cover is provided at the bottom of the camera body.

However, when the distance X' from an axis T perpendicular to the optical axis of the lens 17 to the film regulation component mounting surface 21c and the distance Y' from the axis T perpendicular to the optical axis of the lens 17 to the outer rail surface 21a do not match due to variations in the structure within dimension allowances (tolerances), when the regulation surface 22a is tight against the outer rail surface 21a, the regulation component 22 and the camera body 21 warp. As a result, the regulation surface 22a tilts and warps with respect to a preset image-forming surface of the lens 17, thereby making it impossible to maintain the flatness of the film 3 desired for photography, making extra adjustments necessary such as a washer between the regulation component mounting surface 21c and the camera body mounting surface 22b. As a result, the number of production processes has to be increased.

Additionally, heat deformation due to temperature changes in the camera may take place, for example, if a camera is taken out of a car to take a picture in the middle of the summer. Due to temperature changes, heat deformation (thermal expansion) occurs in the camera body 21 and the regulation component 22 in a direction perpendicular to the optical axis 17 and the scrolling direction of the film 3. When the amount of thermal expansion of the camera body 21 and the regulation component 22 differs, the regulation component 22 distorts, resulting in the failure to maintain the desired flatness for the film 3 to take a picture. This problem is caused by the fact that the camera body 21 and the regulation component 22 are each anchored with mounting surfaces 21c and 22b making direct contact with each other.

SUMMARY OF THE INVENTION

An object of embodiments of the present invention is to provide a compact camera wherein extra adjustments are not needed to keep the film flat.

Another object of embodiments of the present invention is to provide a camera that maintains the flatness of the film even when the temperature changes within the camera.

In order to achieve those and other objects, in first, second and third embodiments of the invention, a space is formed between outer rails of a camera body and a surface of a regulation component mounted to the camera body by a mounting member (such as a screw, for example) and facing the outer rails. The design is such that the space is smaller in the direction of the optical axis than the thickness of the film so that the photographic film cannot enter the space. A recess may be formed in a surface of one of the regulation component or the camera body to receive outer rails on the other of the regulation component or the camera body.

By the presence of the space, contact between an outer rail surface and the element it faces is suppressed. However, even if contact does occur temporarily, the amount of contact is kept small so that the film regulation surface of the film regulation component maintains film flatness.

In fourth, fifth, sixth and seventh embodiments of the invention, a space is formed between the regulation component mounting surfaces and the body mounting surfaces, with the camera body and the regulation component making contact on the outer rails. A deformation unit, provided in at least one of the camera body and the regulation component, may be deformed to enable contact between the regulation component mounting surfaces and the camera body mounting surfaces when an anchoring unit such as, for example, an anchoring screw tightens the connection between the camera body and the regulation component. The deformation of the deformation unit may be an elastic deformation or a plastic deformation.

The fixed connection between the regulation component mounting surfaces and the body mounting surfaces anchors the film regulation component onto the camera body to maintain the flatness of the film regulation surface.

In an eighth embodiment of the invention, the camera is constructed with the camera body and the regulation component having virtually equal thermal expansion coefficients.

A regulation component is mounted on the camera body by means of an anchoring unit, and even if deformation by heat occurs in the camera body and the regulation component, the amounts of expansion of both are equivalent due to the virtually equal thermal expansion coefficients of the camera body and the regulation component. Thus, the flatness of the regulation surface of the regulation component is maintained with the regulation component anchored to the camera body.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
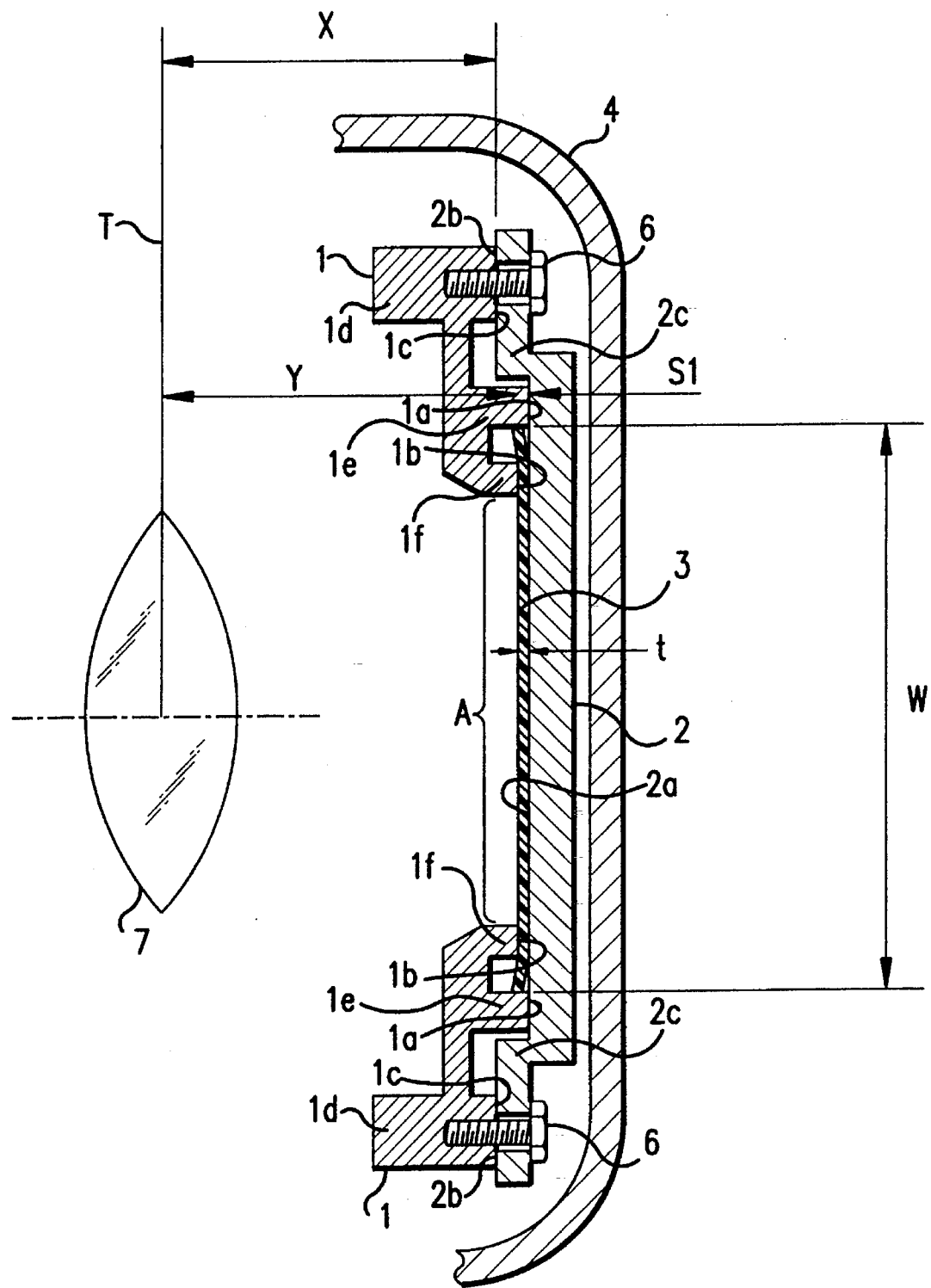
FIG. 1 is a drawing showing a cross-section of a first embodiment of the present invention.
Figure 2:
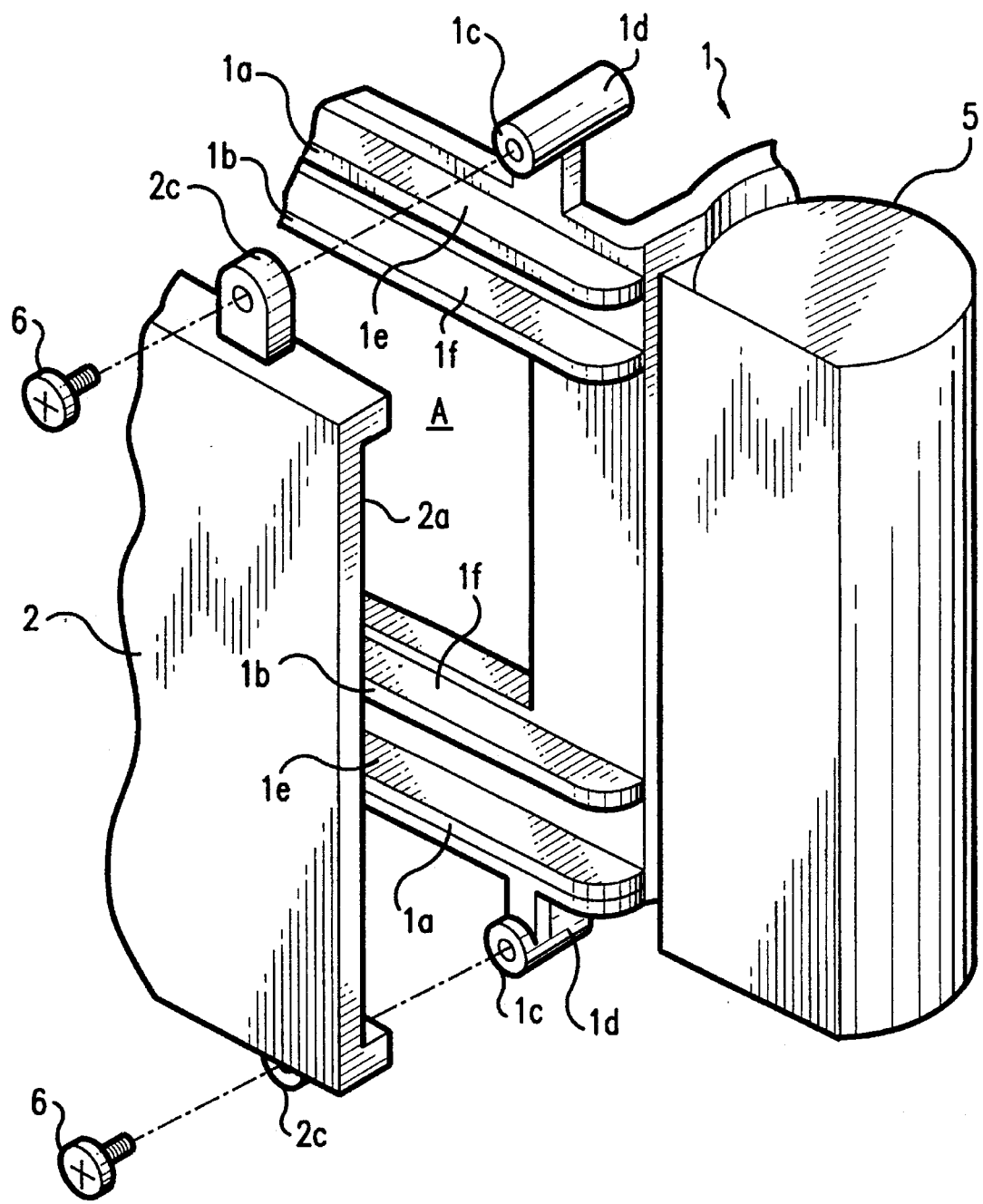
FIG. 2 is a drawing showing an oblique view of the first embodiment of the present invention.

FIG. 1 is a drawing showing a cross-section of a first embodiment of the present invention. FIG. 2 is an oblique view of the first embodiment.

With reference to FIG. 1, the camera body 1 is formed of metal materials such as die cast aluminum, or of non-metallic materials such as polycarbonate (PC) and acrylonitrile butadiene-styrene copolymer resin (ABS resin) or the like, a film regulation component 2 (pressure plate, pressure unit), which is formed of metal materials such as die cast aluminum or of non-metallic materials such as PC and ABS resin, being mounted to the camera body 1 by means of an anchoring unit including a plurality of mounting screws 6. A back cover 4 is provided on the side of the camera body 1 toward the film regulation component 2, and the lens 7 is provided on the opposite side. The structure of the device is such that a photographic film 3 of the thickness t can be wound in a direction perpendicular to the film surface between the camera body 1 and the regulation component 2. As shown in FIG. 2, a film cartridge 5 is positioned near the aperture A used for film exposure so that the film 3 can be fed.

The camera body 1 is provided with inner rails 1f and outer rails 1e, which are spaced from each other in a direction perpendicular to the direction of the optical axis of the shooting lens 7 of the aperture A. The inner rail surfaces 1b and the outer rail surfaces 1a of the inner rails 1f and outer rails 1e, respectively, facing the back cover 4 are flat. The camera 1 has a film regulation component mounting unit 1d, with a film regulation component mounting surface 1c, which contacts the regulation component 2 formed in the mounting unit 1d, the minimum spacing between the pair of outer rails 1e comprising the inside space W of the outer rails 1e.

As shown in FIG. 2, the dimensions of the regulation component 2 are greater than the dimensions of the aperture A and the separation of the outer rails.

The film regulation surface 2a of the regulation component 2 is provided with sufficient flatness to maintain the flatness of the film 3 desired for photography. The regulation component 2 is provided with a camera body mounting unit 2c, which is equipped with a camera body mounting surface 2b that contacts the camera body 1.

The camera may use various mechanisms for inserting the film 3 into the space between the camera body 1 and the regulation component 2. For example, in the case of a 135-type film cartridge, the mechanism may comprise a structure wherein the tip of the film protruding slightly from the film cartridge is pinched between two rotating rollers and pulled from the cartridge while being conducted to a film feed opening, such as shown in Japanese Laid-Open Patent Application No. 62-156641 discussed previously.

In addition, in the case of a cartridge in which pushing the film out of the cartridge is made possible by the rotation of a spool in the cartridge, which is different from the 135-type film cartridge, the structure may be that shown in Japanese Laid-Open Patent Application No. 3-287150. In that case, the spool is driven rotationally by a drive system in the camera, by which means the tip of the film is pushed out of the cartridge.

The same mechanisms for film insertion and film feed may be used in all the embodiments of the invention, and further discussion of those features is omitted.

A description of the state where the regulation component 2 is attached to the camera body 1 is described hereafter.

The mounting surface 2b contacts the mounting surface 1c, and the regulation component 2 is mounted to the camera body 1 by means of mounting screws 6. A space S1 is formed between the regulation surface 2a and the outer rail surface 1a when the mounting surface 1c and the mounting surface 2b are in contact. In order to prevent the film 3 from being inserted into this space, the space S1 is set so as to be smaller in the direction of the optical axis than the thickness t of the film 3. The size of the space S1 in the direction of the optical axis and the fact that the part of the film 3 near the outer rail 1e curls toward the lens 7 prevent the film 3 from entering into the space S1 even when the regulation surface 2a and the outer rail surface 1a are not in contact. The dimensional tolerances are set so that the space S1 is always equal to or greater than zero and preferably equal to or less than the thickness t of the film. Even if the distance X from an axis T perpendicular to the optical axis of the lens 7 to the regulation component mounting surface 1c and the distance Y from the axis T perpendicular to the optical axis of the lens 7 to the outer rail surface 1a vary structurally within the dimension allowances, the contact between the regulation component 2 and the outer rail surface 1a is suppressed. Because the amount of contact is kept small even when both of these touch, warping and deformation of the regulation surface 2a and the outer rail surface 1a can be prevented. In addition, no warping or deformation is created on the inner rail surface 1b because a space is provided between the inner rail surface 1b and the regulation surface 2a.

By this means, the flatness of the film 3 is maintained by the regulation surface 2a of the regulation component 2 not deforming or warping when the regulation component 2 is directly mounted to the camera body 1.

Figure 3:
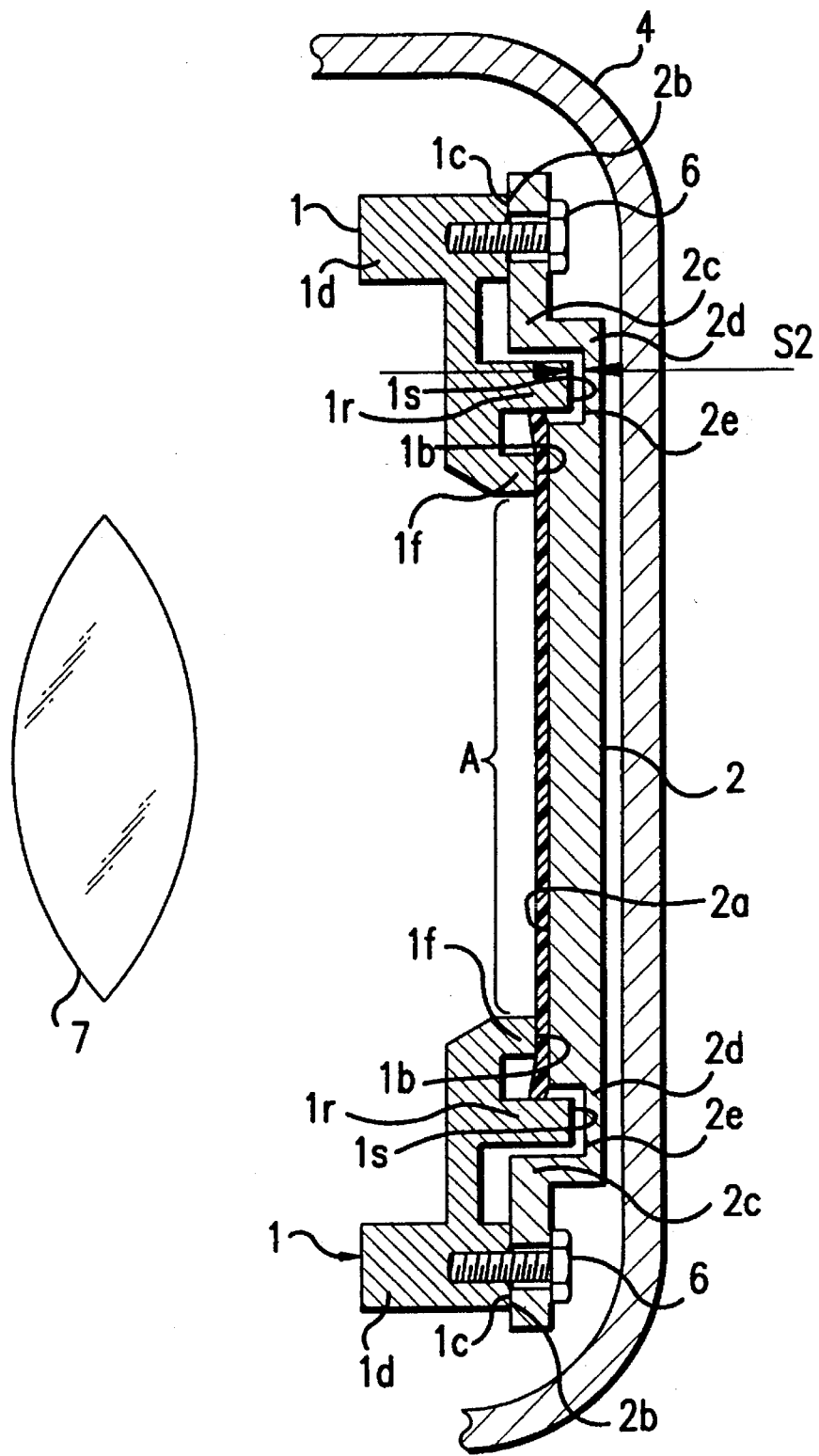
FIG. 3 is a drawing showing a cross-section of a second embodiment of the present invention.

FIG. 3 is a drawing showing a cross-section of a second embodiment of the present invention. Components that are the same in FIG. 3 as in FIG. 1 are marked with identical symbols and explanation of such is omitted here. One difference between this second embodiment and the first embodiment is that the outer rail surface 1s of outer rail 1r is provided in the plane of the film regulation surface 2a or more toward the back cover 4 than is the film regulation surface 2a in order to positively suppress shifting of the film 3 in the direction perpendicular to the direction of the optical axis of the lens 7 and the direction of feeding the photographic film 3. In FIG. 3, a rail surface recess 2d is provided on the regulation component 2 to receive the outer rail surface 1s, a small space S2 being provided between the outer rail surface 1s and the recess surface 2e that faces the outer rail surface 1s in the recess 2d. The outer rail surface 1s and the recess surface 2e do not come into contact even when the mounting surface 1c and the mounting surface 2b contact each other. Therefore, warping and deformation of the regulation surface 2a and the outer rail surface 1s are prevented. In addition, no warping or deformation is created on the inner rail surface 1b because a space is provided between the inner rail surface 1b and the regulation surface 2a. As a result, the film 3 can be maintained at the flatness desired for photography.

In addition, debris can be prevented from entering the space between the camera body 1 and the regulation component 2 because of the crank-shaped cross-sectional form of the regulation component 2 on the side toward the outer cover 4.

Figure 4:
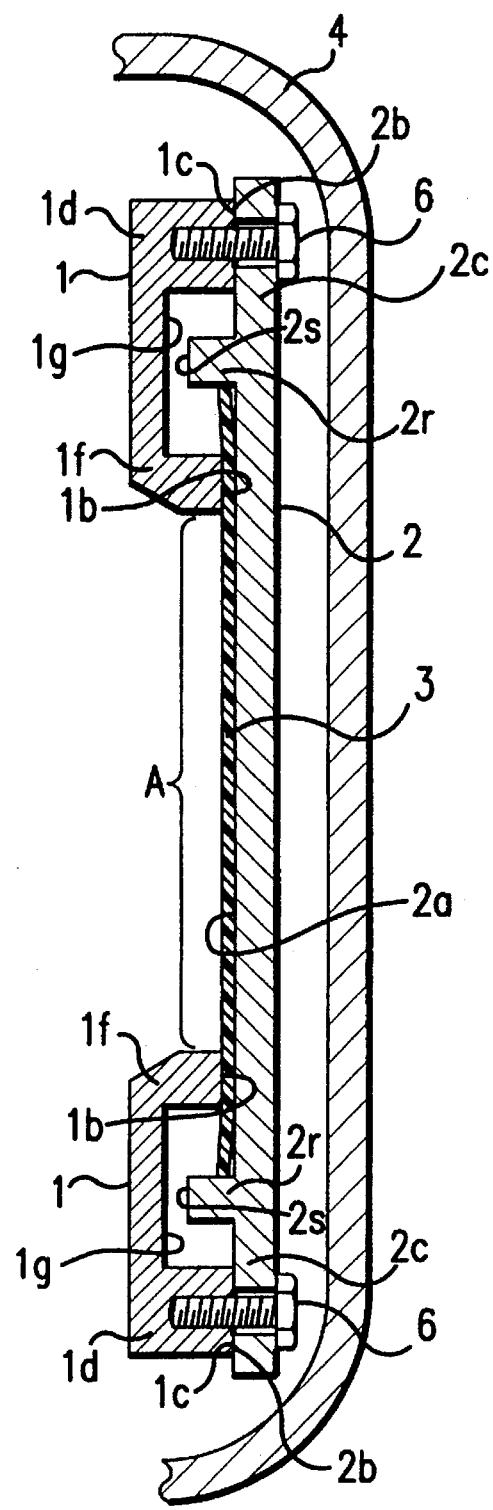
FIG. 4 is a drawing showing a cross-section of a third embodiment of the present invention.
Figure 5:
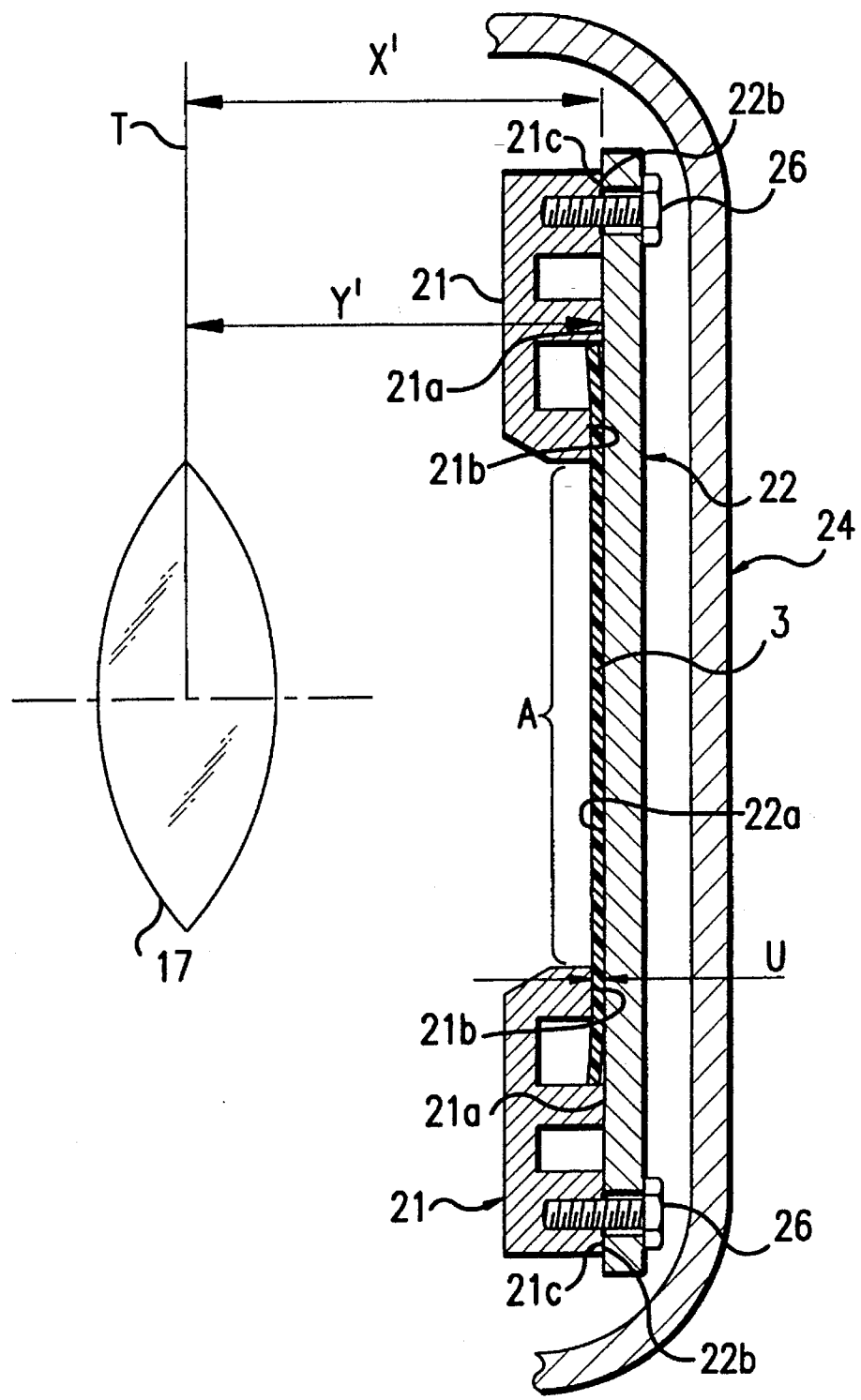
FIG. 5 is a drawing showing a cross-section of a related art photographic film holding structure.

FIG. 4 is a drawing showing a cross-section of a third embodiment of the present invention. Components that are the same in FIG. 4 as in FIG. 1 are marked with identical symbols and explanation of such is omitted here. One difference between this third embodiment and the first embodiment is that the outer rail 2r is formed on the film regulation component 2 in order to positively suppress shifts in the direction perpendicular to the direction of the optical axis of the lens 7 and the direction of feeding the photographic film 3. In FIG. 4, the outer rail surface 2s and the surface 1g of the camera body 1 facing the outer rail 2r do not come into contact even when the mounting surface 1c and the mounting surface 2b contact each other. Therefore, warping and deformation of the regulation surface 2a and the outer rail surface 2s can be prevented. In addition, no warping or deformation is created on the inner rail surface 1b because a space is provided between the inner rail surface 1b and the regulation surface 2a. As a result, the film 3 can be kept at the flatness desired for photography.

By this means, the flatness of the film 3 desired for photography is maintained without the regulation surface 2a of the regulation component 2 deforming or warping, while the regulation component 2 is directly mounted to the camera body 1.

In the first, second and third embodiments, the camera can be made compact because a spring unit conventionally provided in the back cover is not necessary. Furthermore, a space is formed between the outer rail surfaces and the facing component surfaces when the film regulation component mounting surface and the camera body mounting surface are in contact. Because of this, adjustment operations are unnecessary when the regulation component is attached to the camera body. Because the extra adjustment operations are unnecessary, a camera is provided with lower production costs.

Problems with film feeding are controlled because the film does not enter into the space adjacent the outer rail, and the shift in the film in a direction perpendicular to the optical axis of the lens and to the direction of film feeding are controlled. Additionally, debris does not enter into the space between the camera body and the regulation component because the cross-sectional shape of the regulation component is crank shaped on the side toward the back cover.

Figure 6:
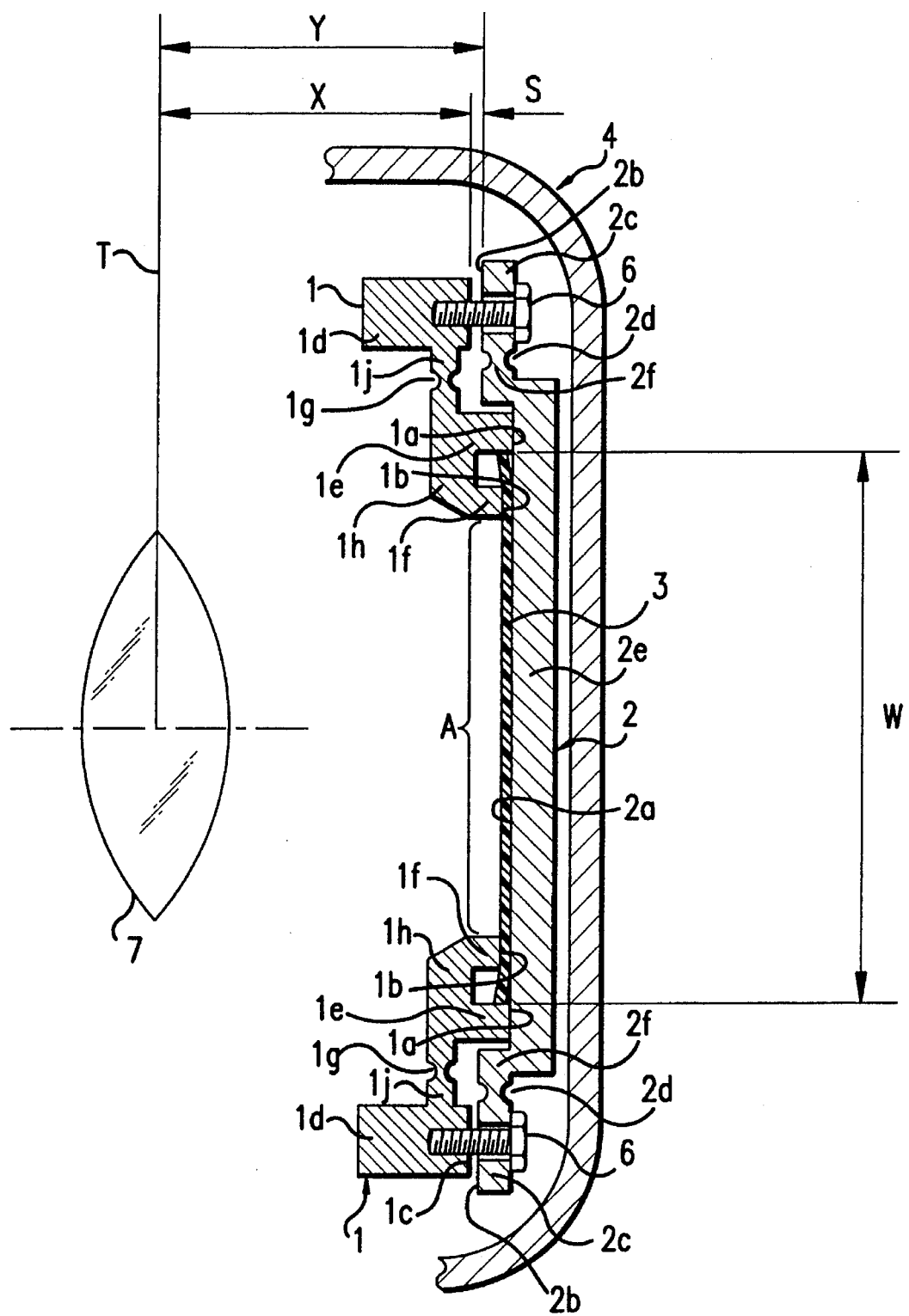
FIG. 6 is a drawing showing a cross-section of a fourth embodiment of the present invention.
Figure 7:
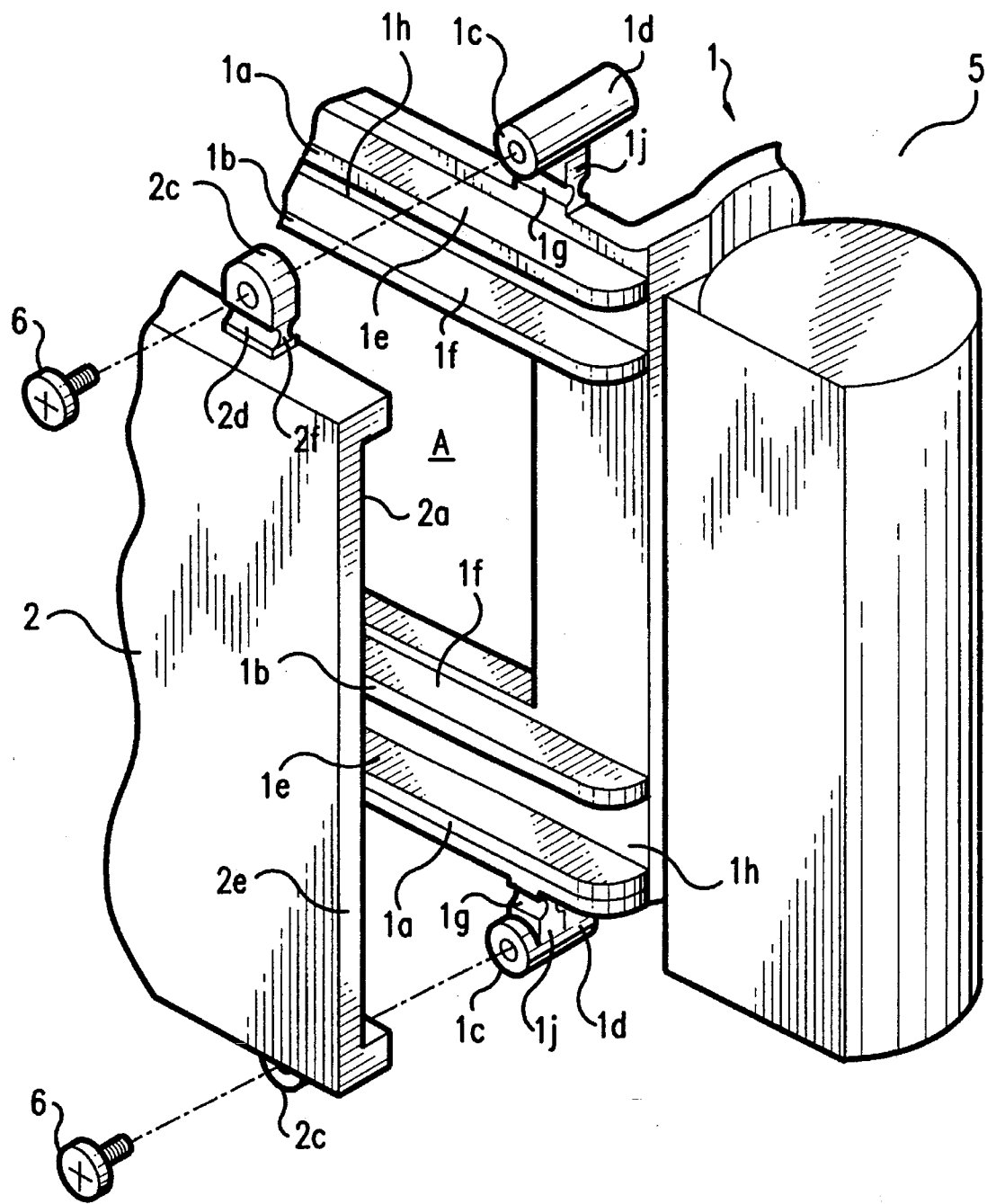
FIG. 7 is a drawing showing an oblique view of the fourth embodiment of the present invention.

FIG. 6 is a cross section of a fourth embodiment of the present invention, and FIG. 7 is its oblique view. Components that are the same in FIGS. 6 and 7 as in FIG. 1 are marked with identical symbols and explanation of such is omitted here. The camera body 1 is made of a metal material, such as die cast aluminum, or a nonmetallic material, such as polycarbonate (PC) or acrylonitrile butadiene-styrene copolymer resin (ABS resin). The film regulation component 2 (pressure board, pressure unit), made of a metal material, such as die cast aluminum, or a nonmetallic material, such as PC or ABS resin, is anchored securely to the camera body 1 by means of screws 6, which comprise the anchoring unit. A back cover 4 is provided on the side of the film regulation component 2 of the camera body 1, while a photographic lens 7 is provided on the opposite side. Photographic film 3 can be wound in a direction perpendicular to the film surface plane between the camera body 1 and the regulation component 2. As shown in FIG. 7, the film cartridge 5 is placed near the opening A for film exposure to enable the feeding of the film 3.

The camera body 1 is provided with rail units 1h on which inner rails 1f are provided spaced in a direction perpendicular to the optical axis of the lens 7 relative to the opening A, and outer rails 1e with outer rail surfaces 1a are provided outside of the inner rails. Each of the outer rail surfaces 1a and the inner rail surfaces 1b facing the back cover 4 are flat. The camera body 1 is provided with the film regulation component mounting units 1d that make contact with the film regulation component mounting surfaces 1c provided on the regulation component 2. The camera body 1 is provided with camera connection units 1j connecting the rail units 1h and the mounting units 1d, camera plastic deformation units 1g being provided in the connection units 1j. The plastic deformation units 1g are made in such a way that the thickness is reduced to a small value only in the direction of the optical axis of the lens 7 to act as a flexible hinge and isolate the relative movement between the rail unit 1h and the mounting units 1d to the direction of the optical axis of the lens 7. The flexible hinge flexes about an axis parallel to an axis perpendicular to the optical axis. The pair of outer rails 1e are separated by a distance W as described earlier.

The film regulation surfaces 2a of the regulation component 2 has sufficient flatness to maintain the flatness of the film 3 required for picture taking, regulation component 2 being provided with a regulation unit 2e and body mounting units 2c, which have body mounting surfaces 2b that make contact with the camera body 1. The regulation component 2 is provided with the regulation component connection units 2f, which connect the regulation unit 2e and the body mounting units 2c. Regulation component plastic deformation units 2d, which deform plastically are provided in the connection units 2f. The plastic deformation units 2d are made in such a way that the thickness is small only in the direction of the optical axis of the lens 7 to isolate the distortion of the mounting units 2c in the direction of the optical axis of the lens 7.

A method and condition of mounting the regulation component 2 on the camera body 1 is described hereafter.

A structure is introduced wherein a space S is formed between mounting surfaces 1c and mounting surfaces 2b when the outer rail surfaces 1a make contact with the regulation component 2. When the anchoring screws 6 are tightened, plastic deformation units 1g and plastic deformation units 2d distort, enabling the mounting surfaces 1c of the camera body 1 and the mounting surfaces 2b of the regulation component 2 to move closer to each other. Although the width of space S may differ for different anchoring positions due to differences in the distance X from the axis T, perpendicular to the optical axis of lens 7, to the body mounting surfaces 1c, and differences in the distance Y from the axis T to the body mounting surfaces 2b within the dimensional tolerances in manufacturing, plastic deformation units 1g and plastic deformation units 2d distort and absorb the dimensional differences. Thus the distortion and deformation of the regulation surfaces 2a and the outer rails 1e can be prevented. Moreover, because of the space between the inner rail surfaces 1b and the regulation surfaces 2a, distortion and deformation do not exist in the inner rail surfaces 1b. As a result, the film 3 is maintained with the flatness desired for picture taking.

In the fourth embodiment, two sets of plastic deformation units, the camera plastic deformation units 1g and the regulation component plastic deformation units 2d, are provided for each of the camera connection units 1j and the regulation component connection units 2f. However, a structure in which the plastic deformation units are provided only on either the camera connection units 1j or the regulation component connection units 2d can also prevent the distortion and deformation of the regulation surfaces 2a and the outer rail surfaces 1a.

Figure 8:
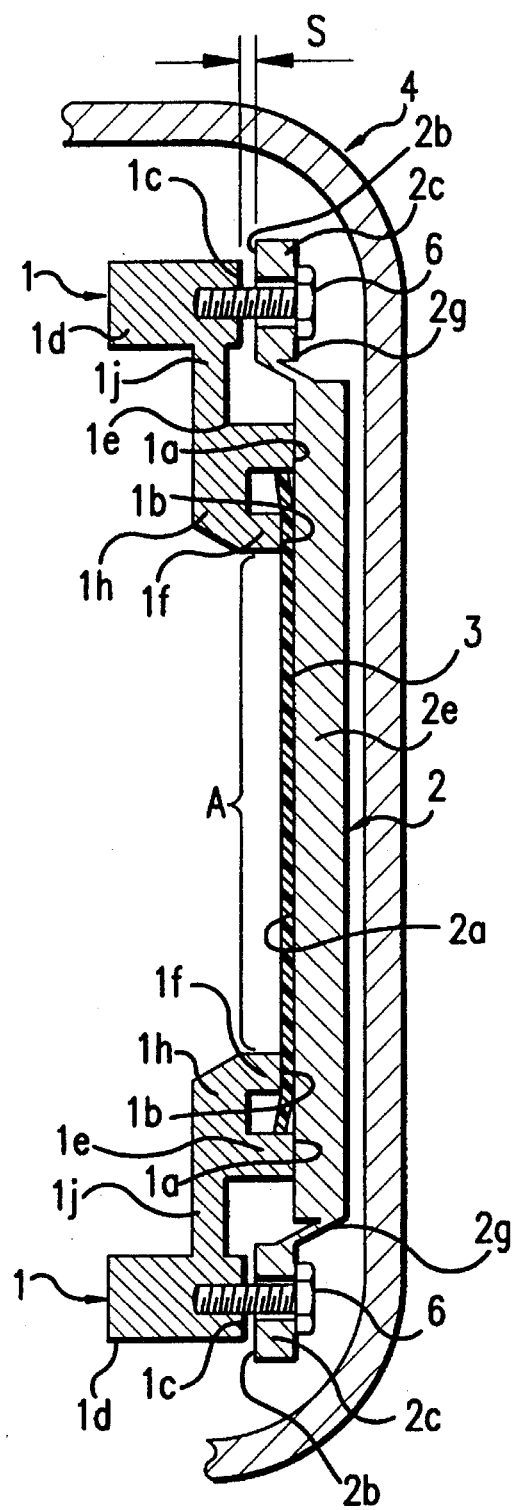
FIG. 8 is a drawing showing a cross-section of a fifth embodiment of the present invention.

FIG. 8 is a cross section of a fifth embodiment of the present invention. Components that are the same in FIG. 8 as in FIG. 6 are marked with identical symbols and explanation of such is omitted here. The fifth embodiment is different from the fourth embodiment in that the camera plastic deformation units 1g are removed and regulation component elastic deformation units 2g are provided in place of the regulation component plastic deformation units 2d. In FIG. 8, a space S is formed between mounting surfaces 1c and mounting surfaces 2b when the outer rail surfaces 1a make contact with the regulation component 2. With the tightening of the anchoring screws 6, the elastic deformation units 2g distort, enabling the mounting surfaces 1c of the camera body 1 and the mounting surfaces 2b of the regulation component 2 to move closer to each other. With the above structure, the distortion and deformation of the regulation surfaces 2a and the outer rails 1e can be prevented, due to the distortion of the elastic deformation units 2g, even if mounting surfaces 1c and mounting surfaces 2b make direct contact. Moreover, due to the space between the inner rail surfaces 1b and the regulation surfaces 2a, distortion and deformation do not exist in the inner rail surfaces 1b. As a result, the film 3 is maintained with the flatness desired for picture taking.

In the fifth embodiment, as shown in FIG. 8, the elastic deformation units 2g include thin strips of uniform thickness throughout cross-sections parallel to the optical axis.

Figure 9:
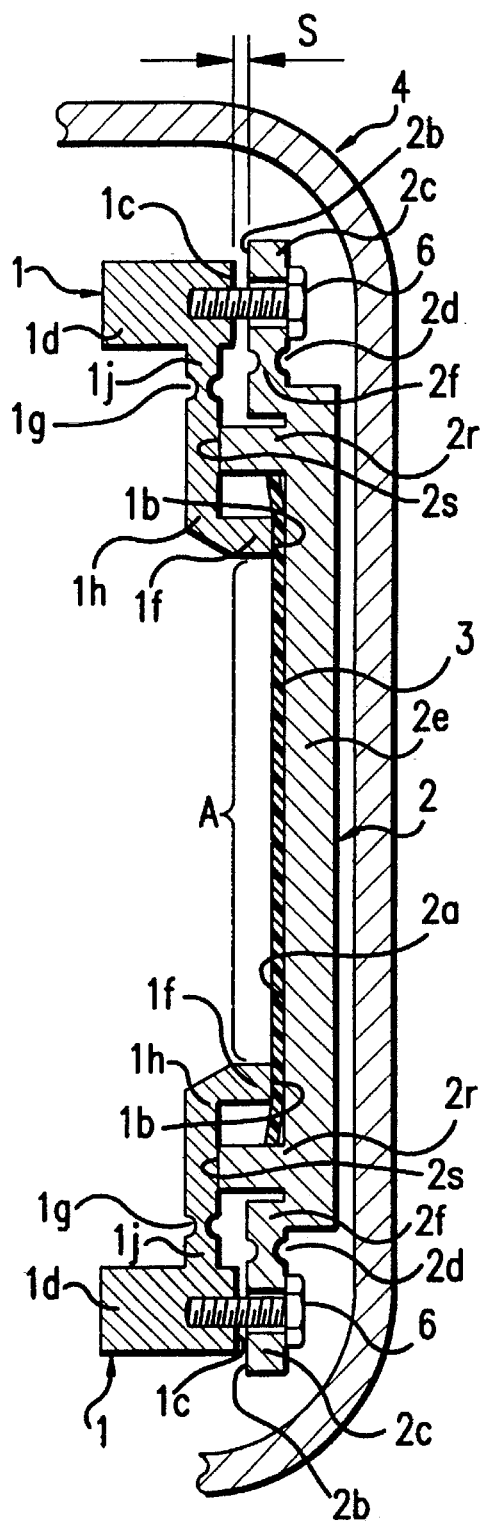
FIG. 9 is a drawing showing a cross-section of a sixth embodiment of the present invention.

FIG. 9 shows a cross section of a sixth embodiment of the present invention. Components that are the same in FIG. 9 as in FIG. 6 are marked with identical symbols and explanation of such is omitted here. The difference of the sixth embodiment from the fourth embodiment is that the outer rails 2r with outer rail surfaces 2s are provided on the regulation component 2 to positively control a vertical shift between the feeding direction of the film 3 and the optical axis direction of the photographic lens 7. In FIG. 9, a space S is formed between the mounting surfaces 1c and the mounting surfaces 2b when the outer rail surfaces 2s make contact with the camera body 1. With the tightening of the anchoring screws 6, plastic deformation units 1g and plastic deformation units 2d distort, enabling the mounting surfaces 1c and the mounting surfaces 2b to move closer to each other. With the above structure, distortion and deformation of the regulation surfaces 2a and the outer rails 2r can be prevented, due to distortion of plastic deformation units 1g and plastic deformation units 2d, even if mounting surfaces 1c and mounting surfaces 2b make direct contact. Moreover, due to the space between the inner rail surfaces 1b and the regulation surfaces 2a, distortion and deformation do not exist in the inner rail surfaces 1b. As a result, the film 3 is maintained with the flatness desired for picture taking.

In the sixth embodiment, two sets of plastic deformation units, the camera plastic deformation units 1g and the regulation component plastic deformation units 2d, are provided on each of the camera connection units 1j and the regulation component connection units 2f. However, a structure in which plastic deformation units are provided only on either the camera connection units 1j or the regulation component connection units 2f can also prevent distortion and deformation of the regulation surfaces 2a and the outer rail surfaces 2s.

Figure 10:
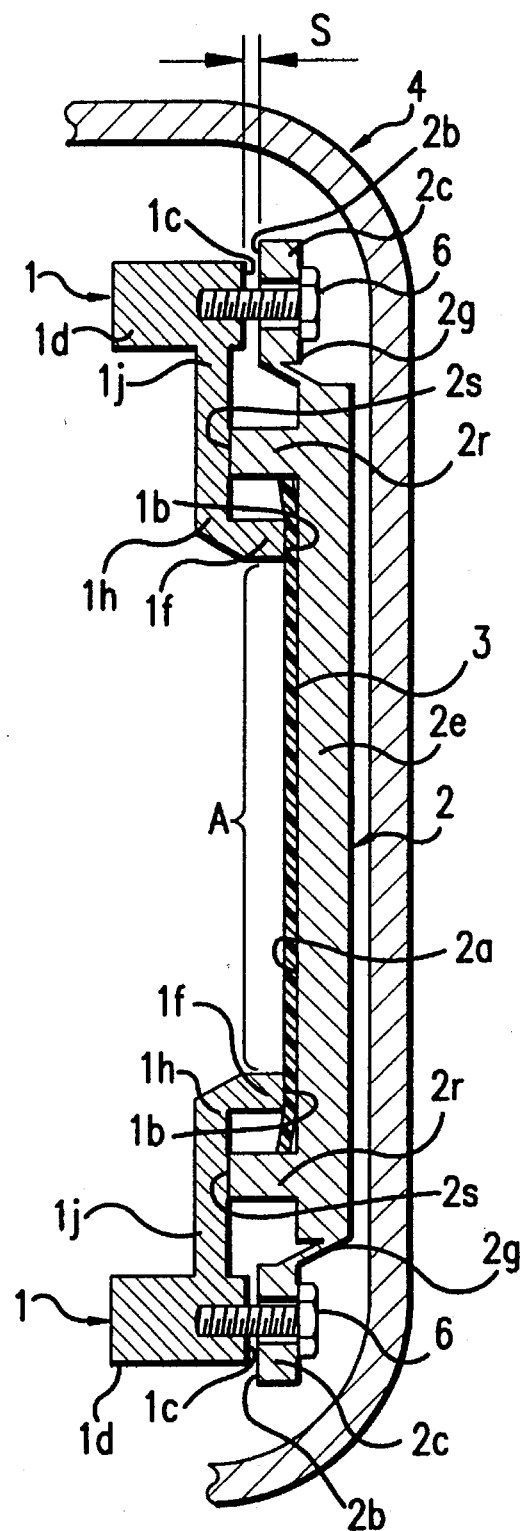
FIG. 10 is a drawing showing a cross-section of a seventh embodiment of the present invention.

FIG. 10 is a cross section of a seventh embodiment of the present invention. Components that are the same in FIG. 10 as in FIG. 8 are marked with identical symbols and explanation of such is omitted here. The seventh embodiment is different from the fifth embodiment in that the outer rails 2r with outer rail surfaces 2s are provided on the regulation component 2 to positively control a vertical shift between the feeding direction of the film 3 and the optical axis direction of the photographic lens 7. In FIG. 10, a space S is formed between the mounting surfaces 1c and the mounting surfaces 2b when the outer rail surfaces 2s make contact with the camera body 1. With the tightening of the anchoring screws 6, the elastic deformation units 2g distort, enabling the mounting surfaces 1c and the mounting surfaces 2b to move closer to each other. As in the fifth embodiment, the plastic deformation units 2g include thin strips of uniform thickness throughout cross-sections parallel to the optical axis.

With the above structure, distortion and deformation of the regulation surfaces 2a and the outer rails 2r can be prevented, due to the distortion of the elastic deformation units 2g, even if mounting surfaces 1c and mounting surfaces 2b make direct contact. Moreover, due to the space between the inner rail surfaces 1b and the regulation surfaces 2a, distortion and deformation is not present in the inner rail surfaces 1b. As a result, the film 3 is able to maintain the flatness required for picture taking.

In the fourth, fifth, sixth and seventh embodiments of the present invention, the deformation unit provided in at least one of the camera body 1 and the regulation component 2 deforms when the regulation component 2 is mounted on the camera body 1 with the anchoring unit, enabling the mounting surfaces 1c and the mounting surfaces 2b, which are anchoring surfaces, to move closer to each other. The deformation absorbs the dimensional variations within the dimensional tolerances, making extra adjustments unnecessary in mounting the regulation component 2 on the camera body 1, enabling camera production at low cost.

The deformation unit provided in at least one of the body of camera 1 and the regulation component 2 is either a plastic deformation unit or an elastic deformation unit. Mounting surfaces 1c and mounting surfaces 2b, which comprise the anchoring surfaces, may make direct contact with sufficient tightening of the anchoring unit.

Figure 11:
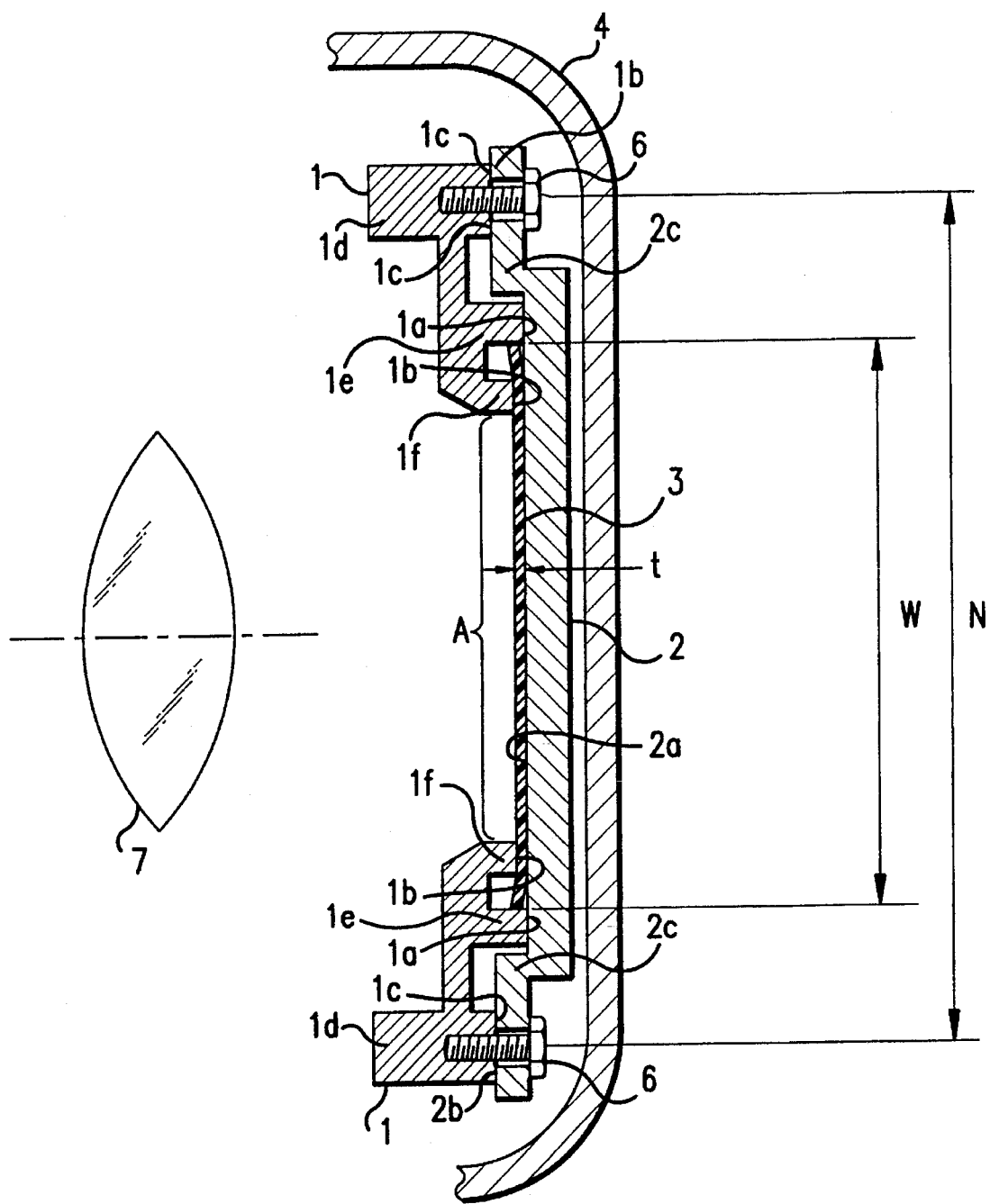
FIG. 11 is a drawing showing a cross-section of an eighth embodiment of the present invention.
Figure 12:
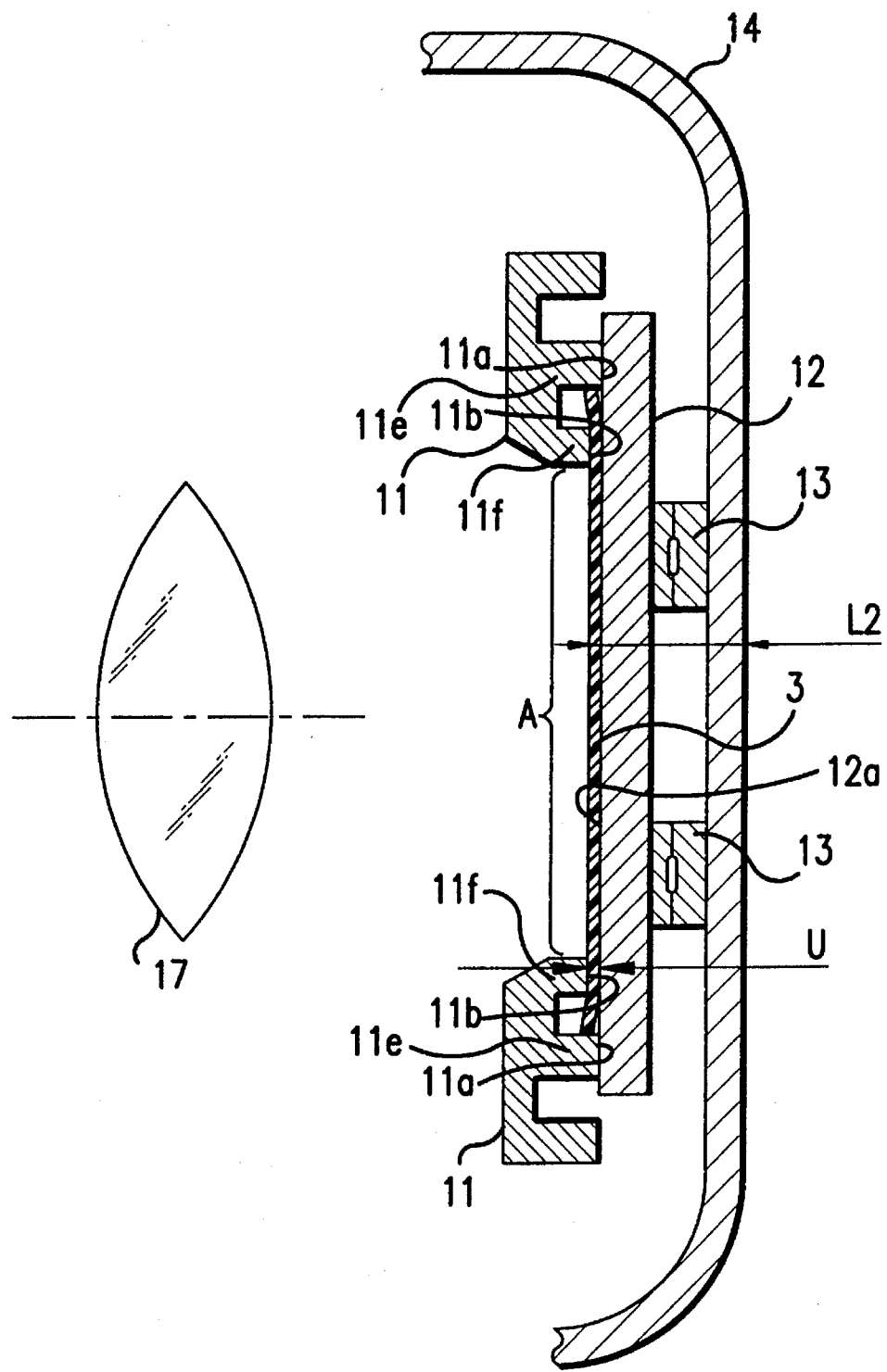
FIG. 12 is a drawing showing a cross-section of a related art photographic film holding structure.

FIG. 11 is a cross section of an eighth embodiment of the present invention. Components that are the same in FIG. 11 as in FIG. 1 are marked with identical symbols and explanation of such is omitted here. The camera body 1 is made of a metal material, such as die cast aluminum, or a nonmetallic material, such as polycarbonate (PC) or acrylonitrile butadiene-styrene copolymer resin (ABS resin). The film regulation component 2 (pressure board, pressure unit), made of the same material or a material with an equal or nearly equal coefficient of thermal expansion as the camera body 1 is anchored securely to the camera body 1 by means of anchoring screws 6, each of which comprises an anchoring unit. The screws are separated by a distance N in the direction perpendicular to the film feed direction as shown in FIG. 11.

A method and condition of mounting the regulation component 2 on the camera body 1 will be described hereafter.

The mounting surface 1c and the mounting surface 2b make direct contact with each other, the regulation component 2 being anchored to the camera body 1 by means of the anchoring screws 6. Even if the environment surrounding the camera changes, causing a temperature change of $\Delta T$, the amounts of thermal deformation of the camera body 1 and the regulation component 2 in the direction perpendicular to the optical axis of the lens 7 and the feeding direction of the film 3 are the same and equal to the quantity ($N \times K \times \Delta T$), where K is the thermal expansion coefficient of either the camera body or the regulation component, since both the camera body 1 and the regulation component 2 are made of the same material or materials with almost identical coefficients of thermal expansion.

Thus, even when the camera body 1 and the regulation component 2 are anchored by means of the anchoring screws 6 with mounting surfaces 1c and 2b in direct contact, distortion in the regulation surfaces 2a of the regulation component 2 is prevented because the amounts of thermal deformation of the camera body 1 and the regulation component 2 for the dimension N mentioned above are equal.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera comprising:
   a lens having an optical axis;
   a film feeding passage through which film is fed in a direction perpendicular to the optical axis;
   a camera body including an aperture through which an image of a subject formed by said lens is exposed onto said film;
   a pair of inner rails on said camera body that are positioned outside of said aperture and on opposite sides of said aperture;
   a pair of outer rails positioned outside of said inner rails and on opposite sides of said inner rails, said outer rails regulating the position of said film in a direction perpendicular to the direction of film feeding and perpendicular to the optical axis of said lens;
   a regulation component that includes a regulation surface that regulates the position of said film in the direction of the optical axis in conjunction with said pair of inner rails, wherein said outer rails are formed on one of said camera body and said regulation component and said outer rails include outer rail surfaces facing surfaces of the other of said camera body and said regulation component and separated therefrom by a space, and wherein a dimension of said regulation component in the direction perpendicular to the direction of film feeding and perpendicular to the optical axis is greater than a distance between said pair of outer rails, and the dimension of the regulation component is greater than a dimension of the aperture in the direction of film feeding; and
   an anchoring unit that anchors the regulation component to the camera body.

2. The camera of claim 1, wherein said space is smaller in the direction of the optical axis than a thickness of said film.

3. The camera of claim 1, wherein said outer rails are formed on said camera body.

4. The camera of claim 3, wherein said regulation surface includes a recess, one of said outer rails protruding into said recess.

5. The camera of claim 4, wherein said regulation surface defines a plane and said plane intersects said outer rails.

6. The camera of claim 1, wherein said outer rails are formed on said regulation component.

7. The camera of claim 6, wherein said inner rails include inner rail surfaces facing surfaces of said regulation component and separated therefrom by a space which is smaller than an amount of projection of said outer rails from said regulation surface in the direction of the optical axis.

8. The camera of claim 1, wherein said anchoring unit includes a mounting screw.

9. A camera comprising:
   a lens having an optical axis;
   a film feeding passage through which film is fed in a direction perpendicular to the optical axis;

a camera body including a mounting surface and an aperture through which an image of a subject formed by said lens is exposed onto said film;

a pair of inner rails on said camera body that are positioned outside of said aperture and on opposite sides of said aperture;

a pair of outer rails positioned outside of said inner rails and on opposite sides of said inner rails, said outer rails regulating the position of said film in a direction perpendicular to the direction of film feeding and perpendicular to the optical axis of said lens;

a regulation component including a mounting surface and a regulation surface that regulates the position of said film in the direction of the optical axis in conjunction with said pair of inner rails, wherein said outer rails are formed on one of said camera body and said regulation component and said outer rails include outer rail surfaces facing surfaces of the other of said camera body and said regulation component, and wherein a dimension of said regulation component in the direction perpendicular to the direction of film feeding and perpendicular to the optical axis is greater than a distance between said pair of outer rails;

an anchoring unit that anchors the regulation component to the camera body by bringing the mounting surfaces of said camera body and of said regulation component into contact, wherein said outer rail surfaces contact the other of said camera body and said regulation component before said mounting surfaces of said camera body and of said regulation component contact; and a deformation unit included in at least one of said camera body and said regulation component, said deformation unit deforming to produce relative movement at least between said mounting surface of said camera body and said inner rails or between said mounting surface of said regulation component and said regulation surface when the mounting surfaces of said camera body and of said regulation component are brought into contact.

10. The camera of claim 9, wherein said deformation unit deforms elastically.

11. The camera of claim 9, wherein said deformation unit deforms plastically.

12. The camera of claim 9, wherein said deformation unit comprises a flexible hinge that has a thickness reduced in the direction of the optical axis to allow relative movement between the portions of said camera body or the portions of said regulation component joined by said flexible hinge by flexure of said flexible hinge about an axis perpendicular to an axis parallel to the optical axis.

13. The camera of claim 9, wherein said deformation unit includes a thin strip of uniform thickness throughout a cross-section parallel to the optical axis.

14. The camera of claim 9, wherein said deformation unit is in said camera body.

15. The camera of claim 9, wherein said deformation unit is in said regulation component.

16. The camera of claim 9, wherein a deformation unit is provided in each of said regulation component and said camera body.

17. The camera of claim 9, wherein said anchoring unit includes a mounting screw.

18. A camera comprising:

a lens having an optical axis;

a film feed passage through which film is fed in a direction perpendicular to the optical axis;

a camera body including an aperture through which an image of a subject formed by said lens is exposed onto said film;

a pair of inner rails on said camera body that are positioned outside of said aperture and on opposite sides of said aperture;

a pair of outer rails positioned outside of said inner rails and on opposite sides of said inner rails, said outer rails regulating the position of said film in a direction perpendicular to the direction of film feeding and perpendicular to the optical axis of said lens;

a regulation component that includes a regulation surface that regulates the position of said film in the direction of the optical axis in conjunction with said pair of inner rails, wherein said outer rails are formed on one of said camera .body and said regulation component and said outer rails include outer rail surfaces facing surfaces of the other of said camera body and said regulation component, and wherein a dimension of said regulation component in the direction perpendicular to the direction of film feeding and perpendicular to the optical axis is greater than a distance between said pair of outer rails; and an anchoring unit that anchors said regulation component to the camera body, wherein coefficients of thermal expansion of material forming said camera body and of material forming said regulation component are substantially equal.

19. The camera of claim 18, wherein said camera body and said regulation component are made of the same material.

20. The camera of claim 18, wherein said anchoring unit includes a mounting screw.

* * * * *